(12) United States Patent
Münzer et al.

(10) Patent No.: US 7,513,092 B2
(45) Date of Patent: Apr. 7, 2009

(54) BEVERAGE BOTTLING PLANT FOR FILLING BOTTLES WITH A LIQUID BEVERAGE FILLING MATERIAL, AND A METHOD FOR THE OPERATION THEREOF

(75) Inventors: Jan Münzer, Dortmund (DE); Thomas Stolte, Bad Kreuznach (DE); Volker Till, Hofheim (DE)

(73) Assignee: KHS Maschinen- und Anlagenbau AG, Dortmund (DE)

( * ) Notice: Subject to any disclaimer, the term of this patent is extended or adjusted under 35 U.S.C. 154(b) by 407 days.

(21) Appl. No.: 10/982,710

(22) Filed: Nov. 5, 2004

(65) Prior Publication Data
US 2005/0126124 A1 Jun. 16, 2005

(30) Foreign Application Priority Data
Nov. 6, 2003 (DE) ................. 103 51 689

(51) Int. Cl.
*B65B 55/18* (2006.01)
*B08B 3/00* (2006.01)
(52) U.S. Cl. ....................... 53/431; 134/108
(58) Field of Classification Search .......... 53/253, 53/331.5, 317, 319, 428, 431; 134/103.1, 134/108
See application file for complete search history.

(56) References Cited

U.S. PATENT DOCUMENTS

| | | | | |
|---|---|---|---|---|
| 4,784,169 A * | 11/1988 | Striedieck | ............... | 134/111 |
| 5,558,138 A * | 9/1996 | Stock et al. | ............... | 141/90 |
| 5,713,403 A * | 2/1998 | Clusserath et al. | .......... | 141/101 |
| 5,855,791 A * | 1/1999 | Hays et al. | ............... | 210/696 |
| 6,185,910 B1 * | 2/2001 | Achhammer | ............... | 53/426 |
| 6,276,113 B1 * | 8/2001 | Bernhard | ............... | 53/253 |
| 6,482,358 B1 * | 11/2002 | Kelsch et al. | ............... | 422/28 |
| 6,696,228 B2 * | 2/2004 | Muraoka et al. | ............ | 430/329 |
| 6,834,473 B2 * | 12/2004 | Wiedemann | ............... | 53/127 |
| 6,851,873 B2 * | 2/2005 | Muraoka et al. | ............ | 396/611 |
| 2002/0073652 A1 | 6/2002 | Wiedemann | | |
| 2002/0170440 A1 | 11/2002 | Wakabayashi | | |
| 2003/0209259 A1 * | 11/2003 | Tung et al. | ............... | 134/18 |

FOREIGN PATENT DOCUMENTS

| | | |
|---|---|---|
| DE | 32 10 341 A1 | 9/1983 |
| DE | 32 11 159 A1 | 9/1983 |
| DE | 199 08 035 A1 | 8/2000 |
| EP | 405402 A2 * | 1/1991 |

* cited by examiner

*Primary Examiner*—Rinaldi I. Rada
*Assistant Examiner*—John Paradiso
(74) *Attorney, Agent, or Firm*—Nils H. Ljungman & Associates (57) ABSTRACT

Beverage bottling plant for filling bottles with a liquid beverage filling material, and a method for the operation thereof. The beverage bottling plant has a treatment system to treat the beverage before the beverage is filled into the bottles, and then treat the beverage again after the filled bottles are closed. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

18 Claims, 6 Drawing Sheets

BEVERAGE BOTTLING PLANT FOR FILLING BOTTLES WITH A LIQUID BEVERAGE FILLING MATERIAL, AND A METHOD FOR THE OPERATION THEREOF

BACKGROUND

1. Technical Field

The present application relates to a beverage bottling plant for filling beverage bottles with a liquid beverage filling material, and a method for the operation thereof as described herein below, as well as a device that is suitable for the performance of the method.

2. Background Information

A beverage bottling plant for filling bottles with a liquid beverage filling material can possibly comprise a beverage filling machine with a plurality of beverage filling positions, each beverage filling position having a beverage filling device for filling bottles with liquid beverage filling material. The filling devices may have an apparatus designed to introduce a predetermined volume of liquid beverage filling material into the interior of bottles to a substantially predetermined level of liquid beverage filling material. The apparatus designed to introduce a predetermined flow of liquid beverage filling material further comprises an apparatus that is designed to terminate the filling of the beverage bottles upon the liquid beverage filling material reaching the predetermined level in bottles. There may also be provided a conveyer arrangement that is designed to move bottles, for example, from an inspecting machine to the filling machine. Upon filling, a closing station closes the filled bottles. There may further be provided a conveyer arrangement configured to transfer filled bottles from the filling machine to the closing station. Bottles may be labeled in a labeling station, the labeling station having a conveyer arrangement to receive bottles and to output bottles. The closing station and the labeling station may be connected by a corresponding conveyer arrangement.

In the beverage industry, especially when bottling highly perishable products, it is customary to treat them. In treatment plants of the prior art, the containers with the products are conveyed in a practically uniform and continuous movement from the entry area to the exit area. During this movement, they are heated until they have absorbed the desired number of treatment units, then cooled, whereupon the treatment process is ended. A treatment tunnel provided for the purpose consequently has a heating section, a superheating and treatment section, and a subsequent cooling section. The individual sections can have additional sub-zones. The gradual heating and cooling thereby achieved is preferred in particular for the glass beverage bottles used in the beverage industry, to avoid the destruction of the glass beverage bottles by abrupt temperature changes. The transfer of heat to the product contained in the beverage bottles is normally achieved by spraying said containers with water as they are moved along on a conveyor belt which allows the sprayed liquid to pass through from below. Underneath the conveyor belt are catch basins for the sprayed fluid, from which the pumps used for the spraying are fed. Between the heating and cooling sections, heat can be exchanged with the sprayed liquid in the individual zones.

To achieve an optimum graduation of the temperatures in the individual sections, the sections are divided appropriately. Generally, the "heating" section has three to four individual zones, the treatment section has two or three zones, and an additional superheating zone can also be provided upstream of the treatment zone. The subsequent "cooling" section in turn has three to four individual zones in which the containers are cooled to the desired exit temperature by decreasing the temperature of the sprayed liquid in steps.

The spray temperatures that are set at any given time are adjusted so that they are appropriate to the product, the length of the zones and the speed of the conveyor belt to ensure that the product in the beverage bottles achieves the specified degree of treatment.

Consequently, during production operation, the minimum amount of heat that must be supplied to the treatment tunnel is the amount that is necessary to heat the beverage and the containers from their temperature on entry to the temperature on exit, with an intermediate heating to the treatment temperature followed by a cooling.

OBJECT OR OBJECTS

The object of the present application is a treatment plant in which, by reducing the temperature at which the beverage bottles exit the treatment housing, the amount of heat that must be added can be reduced, and/or maintaining the same conventional exit temperature the required treatment time and thus the required size of the treatment tunnel can be reduced accordingly.

SUMMARY

The present application therefore teaches that the bottling temperature of the beverage before it is dispensed into the beverage bottles is elevated by the heat of the treatment plant, and the filled beverage bottles are conducted to the treatment plant at this elevated product temperature, whereby the recycled cooled process fluid is used at least in one zone of the cooling section.

In an independent realization of the present application, the beverage is preheated with a process medium of the treatment, the temperature of which is only slightly above the bottling temperature.

Consequently, with these process sequences in combination, a recuperative heat exchange, which is itself part of the prior art, in combination with the pre-heating of the beverage as taught by the present application before the filling process achieves a cooling of the beverage containers in the final section of the treatment tunnel, to a lower exit temperature. The result is a significant reduction in the total amount of heat required for the treatment tunnel. It must thereby be taken into account that the amount of heat that is present in the beverage containers as they exit the treatment tunnel, can be recycled into the heating of the beverage as recovered heat, if a spray medium is available to apply a significant temperature gradient toward the exit temperature to the beverage bottles. The present application thereby teaches that the use of a heat exchanger in the cold beverage stream upstream of the filling machine ensures a significantly more effective transfer of heat. The cooling temperature for the exit side of the treatment tunnel is thereby only a few degrees higher than the storage and/or bottling temperature of the beverage.

The embodiments are explained in greater detail below on the basis of one exemplary embodiment, whereby reference is made to a treatment plant of the prior art of the type described in DE 199 08 035 A1, for example.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Further development details, advantages and possibilities of application of the application can be obtained from the following description of embodiments and the drawing. With this, all described and/or illustrated features per se or in any combination, comprise the substance of the application, regardless of their combination in the claims or their dependency. At the same time, the content of the claims is made a component of the description.

Figure 1:
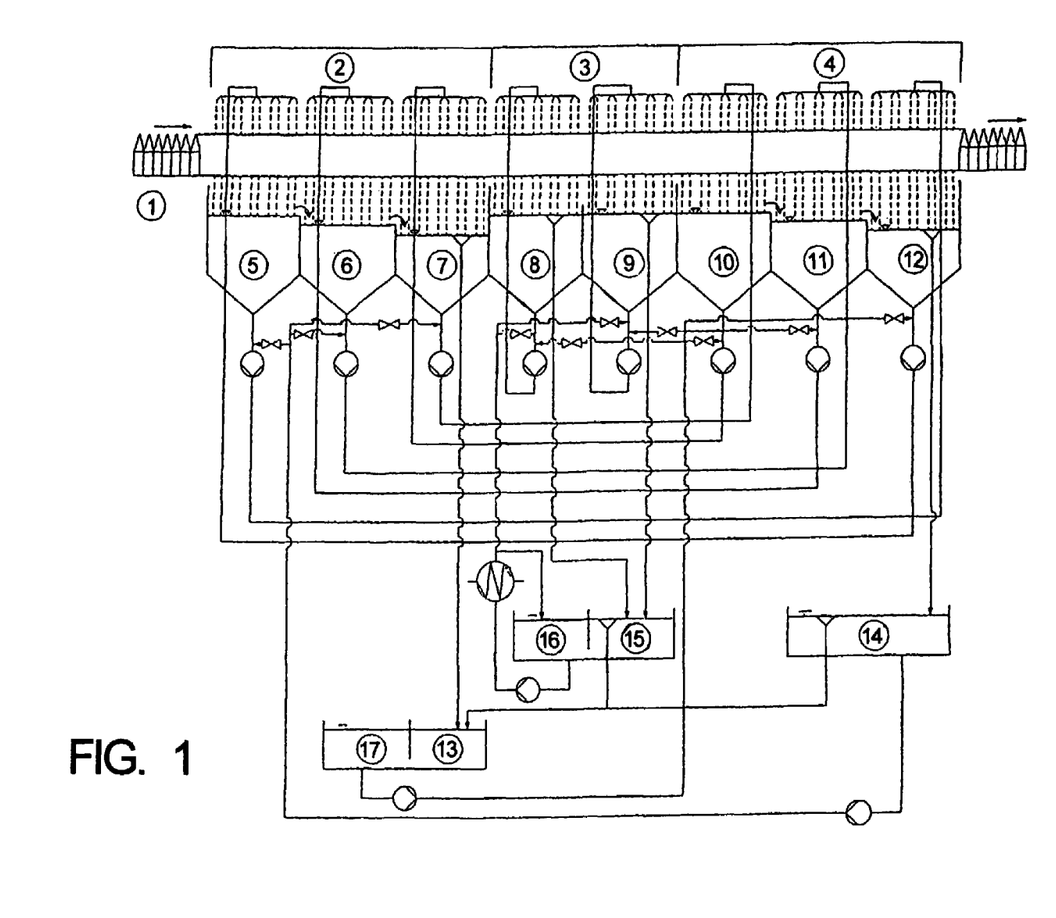
FIG. 1 is a cross section through a treatment plant.
Figure 1A:
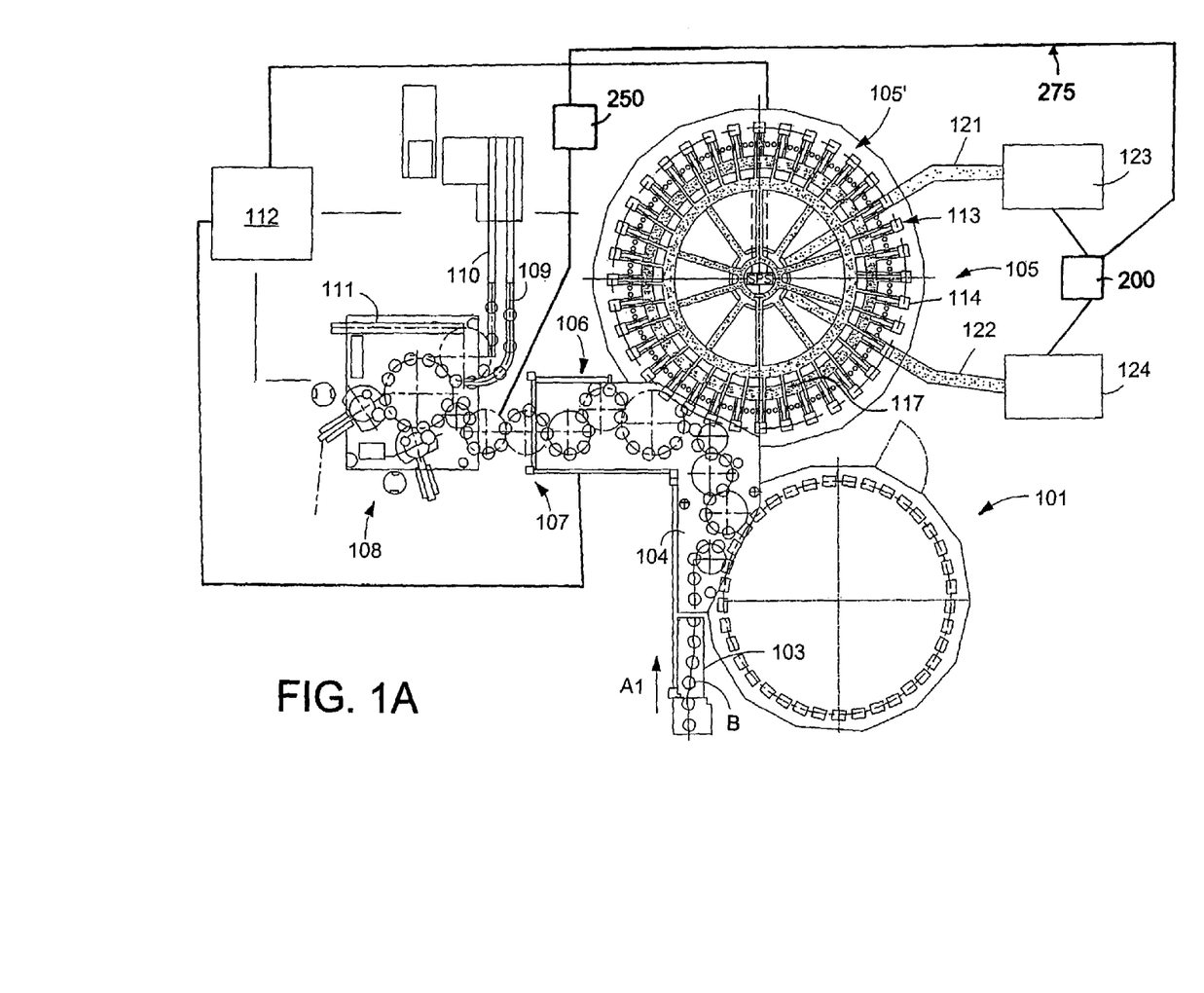
FIG. 1A is a schematic illustration of a container filling plant in accordance with one possible embodiment.

FIG. 1A shows schematically the main components of one embodiment example of a system for filling containers, specifically, an embodiment of a beverage bottling plant 100 for filling bottles B with liquid beverage filling material, in accordance with one embodiment, or in which system or plant could possibly be utilized at least one aspect, or several an aspects, of the embodiments disclosed herein.

FIG. 1A shows a rinsing arrangement or rinsing station 101, to which the containers, namely bottles B, are fed in the direction of travel as is indicated by the arrow A1, by means of a conveyer line or conveyer arrangement to feed bottles to rinsing arrangement 103, and downstream of rinsing arrangement or rinsing station 101, in the direction of travel as is indicated by the arrow A1, the rinsed bottles B are transported to a beverage filling machine 105 by means of a conveyer line or conveyer arrangement 104 to pass bottles to filling machine that is formed, for example, by a starwheel conveyer or a plurality of starwheels of a conveyer arrangement. The conveyer arrangement 104 to pass bottles to filling machine may possibly comprise a starwheel conveying structure that introduces bottles B to the filling machine 105.

Downstream of the filling machine 105, in the direction of travel of the bottles B, there can preferably be a closing arrangement or closing station 106 which closes the bottles B.

The closing arrangement or closing station 106 can, for example, be connected directly to a labeling arrangement or labeling station 108 having at least one labeling unit, device, or module for first product, each unit having a head, such as, for example, by means of a conveyer arrangement 107 to pass bottles to labeling arrangement that may be formed, for example, by a plurality of starwheels of a conveyer arrangement.

In the illustrated embodiment, the labeling arrangement or labeling station 108 having at least one labeling unit, device, or module for first product, each unit having a head has, for example, three outputs, namely one output formed by a conveyer arrangement 109 to convey first product bottles for bottles B that are filled with a first product. The first product may possibly be provided by a first product mixer 123 that is connected to the filling machine 105, for example, through a conduit for first product 121, and bottles B that are filled with a predetermined volume of liquid beverage filling material, that is, the first product, are then labeled by a labeling module in the labeling arrangement or labeling station 108 having at least one labeling unit, device, or module for first product, each unit having a head, corresponding to this first product delivered from first product mixer 123 to the beverage filling machine 105 and thence to the corresponding bottles B.

A second output that is formed by a conveyer arrangement 110 to convey second product bottles is provided for those bottles B that are filled with a second product. The second product may emanate from a second product mixer 124 that is connected, for example, through a conduit for second product 122 to the filling machine 105, and these bottles B filled with a predetermined volume of liquid beverage filling material comprising the second product are then correspondingly labeled by a labeling module in the labeling arrangement or labeling station 108 having at least one labeling unit, device, or module for first product, each unit having a head, corresponding to this second product.

A third output, for example, formed by a conveyer arrangement 111 to convey incorrectly labeled bottles, removes any bottles B which have been incorrectly labeled as may have been determined by an inspecting device or an inspecting station, or an inspecting module 128 that may possibly form a part of the labeling arrangement or labeling station 108 having at least one labeling unit, device, or module for first product, each unit having a head.

In FIG. 1A item 112 is a central control arrangement or, expressed differently, a controller with a computer to process algorithms, which controls the operation of the above-referenced system or plant.

The beverage filling machine 105 is preferably of the revolving design, with a rotor 105', which revolves around a vertical machine axis. The rotor 105' is designed to handle the bottles B by the neck. A filling arrangement 114 having at least one filling device, element, apparatus, or valve, comprises an apparatus configured to introduce a predetermined volume of liquid beverage filling material into the interior of bottles B to a predetermined level of liquid beverage filling material. Furthermore, the filling device or apparatus comprises an apparatus configured to terminate the filling of bottles upon liquid beverage filling material reaching the predetermined level in bottles B. In other words, the filling arrangements 114 having at least one filling device, element, apparatus, or valve, are configured and disposed to provide a predetermined flow of liquid beverage filling material from the source thereof, such as, product mixers 123 and 124, into the bottles B.

The toroidal vessel 117 is a component, for example, of the revolving rotor 105'. The toroidal vessel 117 can be connected by means of a rotary coupling or a coupling that permits rotation, and by means of the conduit for first product 121 to the external reservoir or first product mixer 123 to supply the product.

As well as the more typical filling machines having one toroidal vessel, it is possible that in at least one possible embodiment a filling machine could possibly be utilized wherein each filling arrangement 114 having at least one filling device, element, apparatus, or valve is preferably connected by means of two connections to a toroidal vessel 117 which contains a first product, say by means of a first connection, for example, the conduit for first product 121, and to a second toroidal vessel which contains a second product, say by means of the second connection, for example, the conduit for second product 122. In this case, each filling arrangement 114 having at least one filling device, element, apparatus, or valve can also preferably have, at the connections, two individually-controllable fluid or control valves, so that in each bottle B which is delivered at the inlet of the filling machine 105 to a filling position 113, the first product or the second product can be filled by means of an appropriate control of the filling product or fluid valves.

It will be understood that while a two-product assembly or system of a bottling plant is illustrated in FIG. 1A, the disclosure is equally applicable to single-product installations, or other commensurate embodiments.

FIG. 1A further shows a beverage treatment device 200, which beverage treatment device 200 is connected to the first product mixer 123 and the second product mixer 124 to treat the beverage when the beverage is in the mixers 123, 124. FIG. 1A also shows a beverage bottle treatment station 250 disposed substantially between the bottle closing station 106 and the bottle labeling station 108. The beverage bottle treatment station 250 further treats the beverage material in the closed, filled bottles. A transfer line 275 is shown in FIG. 1A, which transfer line 275 transfers and recycles the treatment material between said beverage treatment device and said beverage bottle treatment station.

Figure 1B:
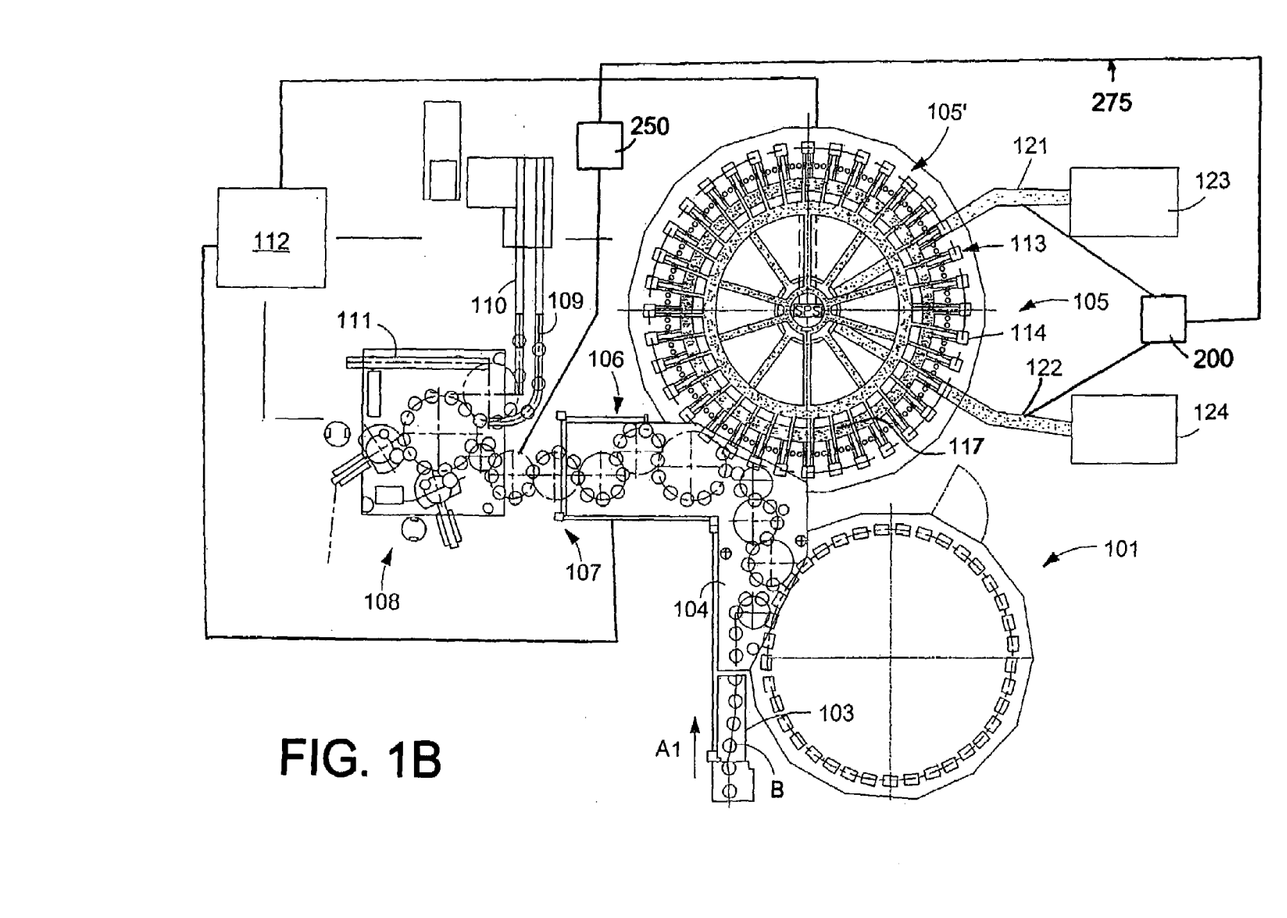
FIG. 1B is similar to FIG. 1A, and shows another possible embodiment of a container filling plant.

FIG. 1B is similar to FIG. 1A, and shows an alternate embodiment where a beverage treatment device 200 is connected to the conduit for first product 121 and the conduit for second product 122 to treat the beverage product when the beverage product is in the conduits 121, 122.

Figure 1C:
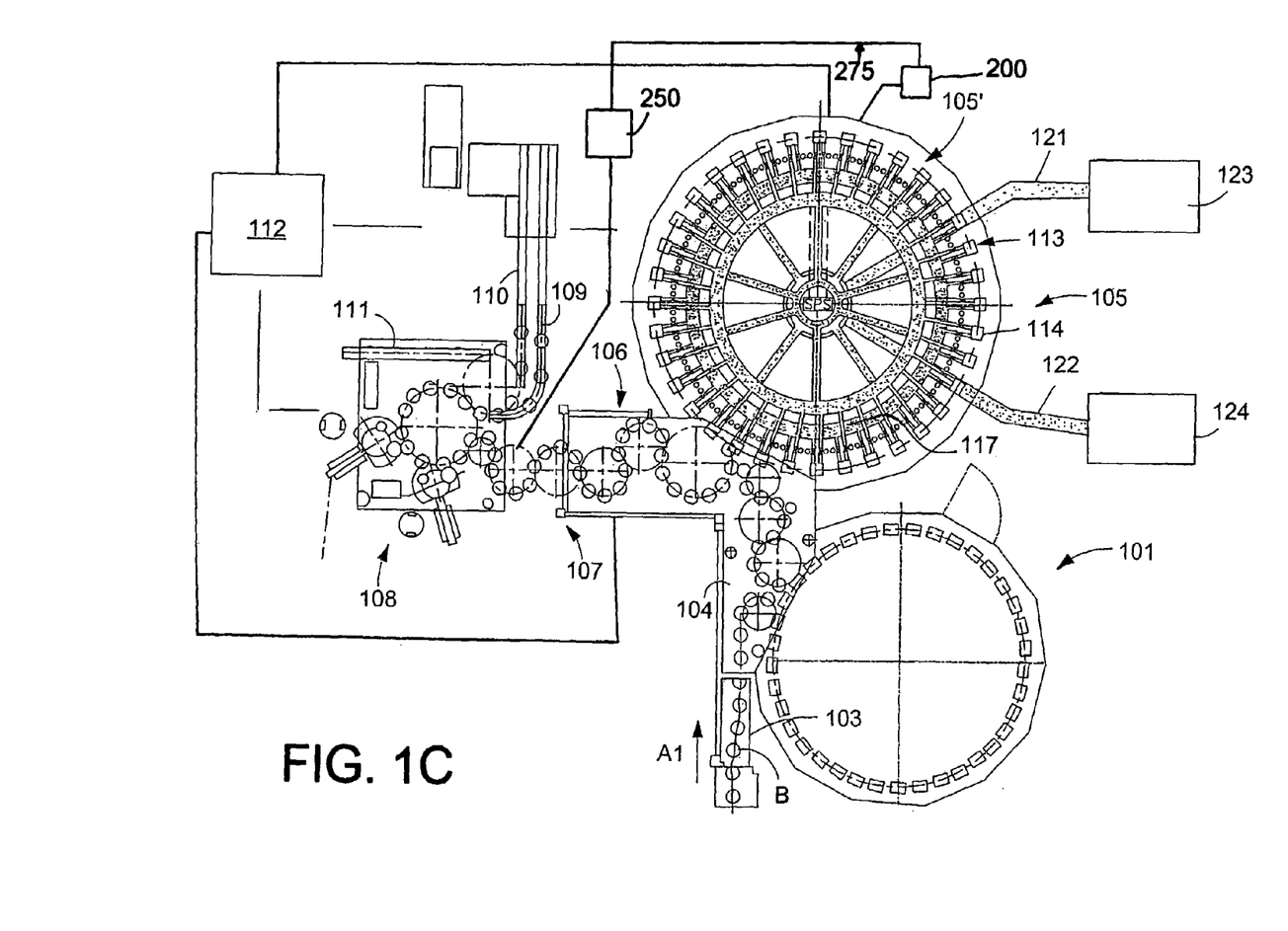
FIG. 1C is similar to FIGS. 1A and 1B, and shows another possible embodiment of a container filling plant.

FIG. 1C is similar to FIGS. 1A and 1B, and shows an alternate embodiment where a beverage treatment device 200 is connected to the beverage filling machine to treat the beverage when it is located in the beverage filling machine.

Figure 1D:
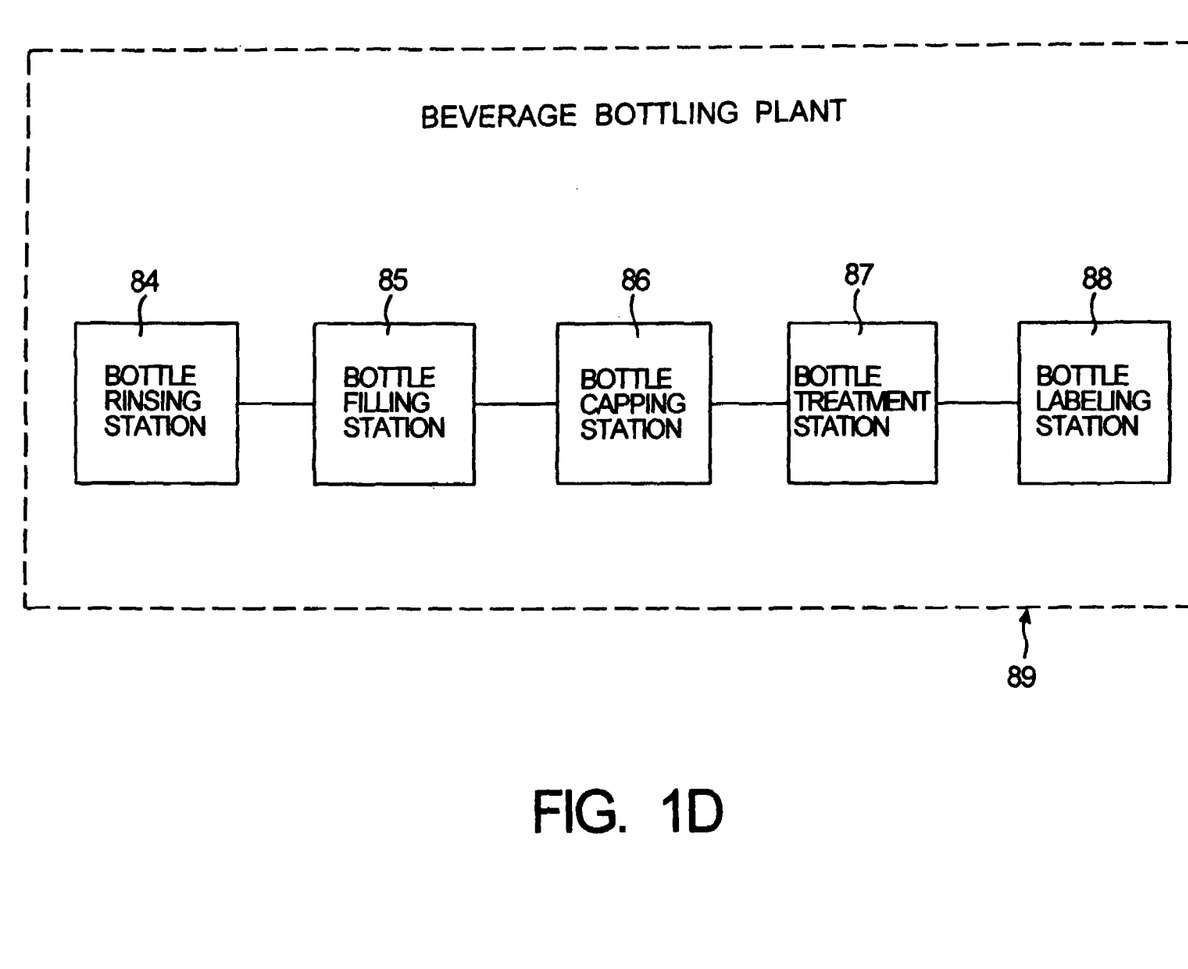
FIG. 1D is a block diagram of a beverage bottling plant and its sections.

FIG. 1D is a block diagram of a beverage bottling plant 89 and the sections 84-88 of this plant 89. Beverage bottles or other containers move through the bottling plant 89 in the following order: beverage bottle rinsing station 84; beverage bottle filling station 85; beverage bottle capping station 86; beverage bottle treatment station 87; and beverage bottle labeling station 88. In one possible embodiment, the beverage bottle treatment station 87 may be a heat treatment station.

As shown in FIG. 1, the treatment plant comprises a heating section 2 which is in the entry area, seen in the direction of travel of the respective containers 1, whereby the heating section 2 can consist of a plurality of individual zones 5-7, as a result of which the heating phase can be carried out gradually. Downstream of this heating section 2 is a superheating zone 8, and after that there is the actual treatment zone 9. Then begins the area of the cooling section 4 which, like the other sections, can consist of a larger number of individual zones 10-12.

The operating program of a treatment plant of this type is designed primarily so that the treatment process can be carried out under optimal conditions. For example, the first heating zone 5 has a spray temperature of 18° C. The output temperature of the treated products is correspondingly achieved with a spraying temperature of approximately 17° C. The second heating zone 6 has a spraying temperature slightly higher than 24° C., whereby the cooling zone that communicates with it can in turn be at a slightly lower temperature of 23° C. From the example of these two zones, it can be seen that the water from the "cooling" zones 4 is transported to the zone in the "heating" section 2, the desired heating temperature of which is the closest to the desired cooling temperature. To equalize any temperature difference, water from the first reservoir 13, whose higher-temperature water originates from the final station 7 of the heating section 2, is added in small quantities to the water from the cooling segment 4. Downstream of this heating section is the superheating zone 8, the temperature of which is in turn higher than the temperature of the final heating zone 7 and is supplied from a second reservoir 15 which is at a higher temperature than the first reservoir 13. Associated with the second reservoir 14 is a third reservoir 16 to which the excess water from the reservoir 15 is fed. This third reservoir 16 is also kept at a predetermined higher temperature by means of a heating device. The superheating and treatment zones 8, 9 are also sprayed with water from this reservoir 16, whereby the hot water that drains off is collected in the second reservoir 15 and mixed with the hot water from the third reservoir 16.

In the event of a disruption, for example an interruption caused by a backup of bottles in the treatment plant, a control device (not shown in any greater detail) immediately actuates certain valves so that, for example, the lower-temperature water from the first reservoir 13 is fed to the superheating and/or treatment zones 8, 9. Lower-temperature water can also be supplied to the other section 2, 4, for example from an additional fourth reservoir 14.

Figure 2:
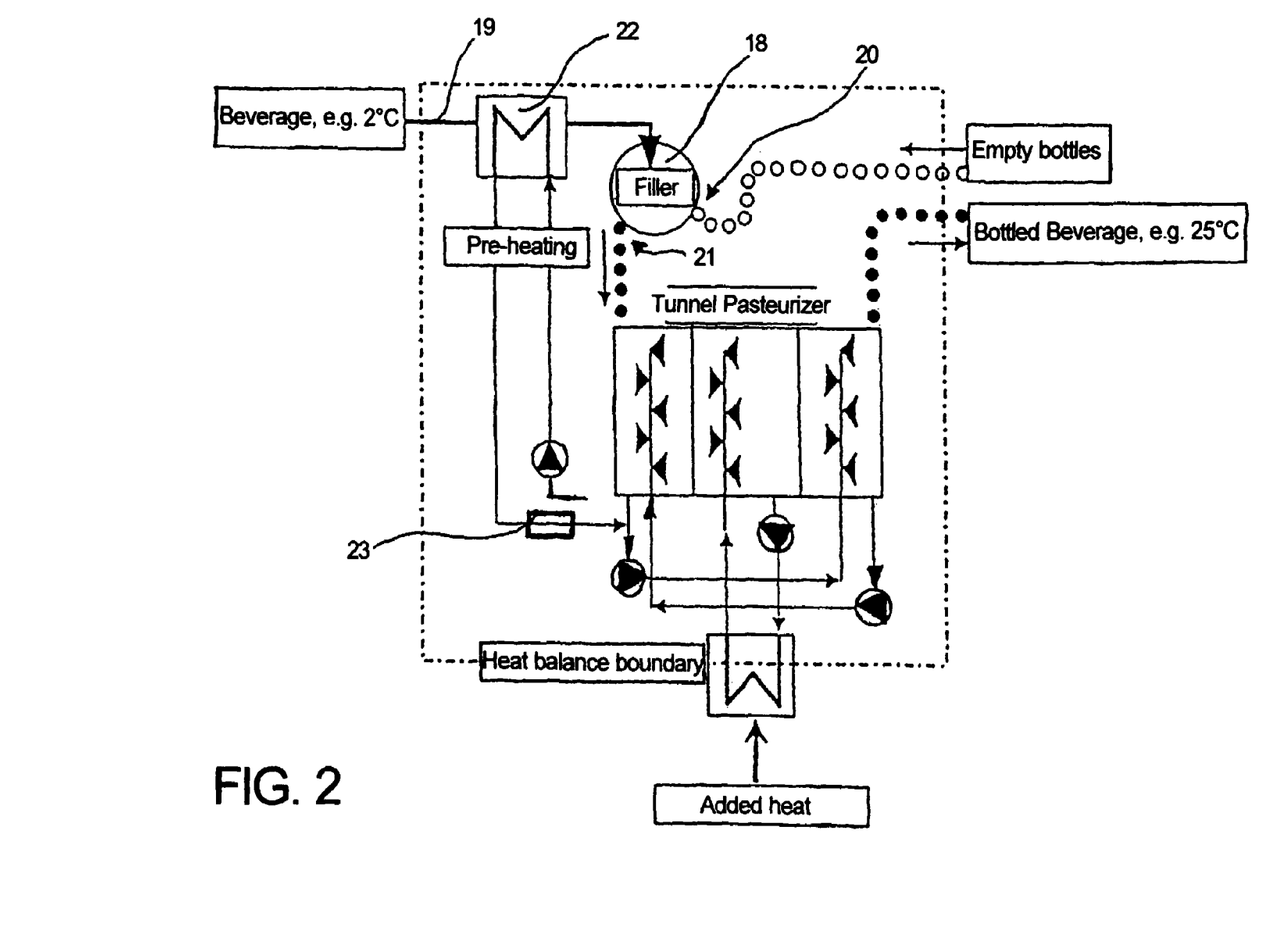
FIG. 2 is a process diagram with arrows to indicate the method taught by the present application as carried out in the treatment plant illustrated in FIG. 1.

In the exemplary embodiment illustrated in FIG. 2, the treatment plant is downstream of a bottling machine 18 to which the cold beverage is fed by means of a line 19. The empty beverage containers are fed to this filling machine on the inlet side 20 and after filling are transported away on the outlet side 21 toward the treatment plant. As shown in the drawing, the warmer treatment liquid is taken from a suitable treatment area 5-7, 10-12 or from elsewhere and is transported to a heat exchanger 22, through which the cold beverage flows at a temperature of 2° C., for example. A corresponding increase in the temperature of the beverage thereby occurs, so that the beverage bottles can be introduced after the filling into the treatment plant at a suitable higher temperature. The warmer treatment liquid is accordingly re-cooled in the heat exchanger 22, whereby a temperature is achieved in the beverage that is slightly higher than its storage temperature. The cooler treatment liquid runs from the heat exchanger 22 preferably toward the exit side of the treatment station into the cooling section 4 and/or into the individual zones 10-12, and consequently contributes to a more effective cooling at the exit from the treatment station. For this purpose, there can be a direct feed line to the cooling section 4 and/or a corresponding intermediate reservoir 23. It is conceivable, however, that this colder spray water that flows back from the secondary area of the heat exchanger can also be reused at any other point of the treatment station, or mixed with water of another temperature. If such further cooling is unnecessary, at the conventional exit temperature can be maintained, and the required treatment time and thus the required size of the treatment tunnel can be reduced accordingly.

Additional description of further embodiments is provided herein below.

The present application therefore teaches that the bottling temperature of the beverage before it is dispensed into the beverage bottles is elevated by the heat of the pasteurizing plant, and the filled beverage bottles are conducted to the pasteurizing plant at this elevated product temperature, whereby the recycled cooled process fluid is used at least in one zone of the cooling section.

In an independent realization of the present application, the beverage is preheated with a process medium of the pasteurizer, the temperature of which is only slightly above the bottling temperature.

Consequently, with these process sequences in combination, a recuperative heat exchange, which is itself part of the prior art, in combination with the pre-heating of the beverage as taught by the present application before the filling process achieves a cooling of the beverage containers in the final section of the tunnel pasteurizer to a lower exit temperature. The result is a significant reduction in the total amount of heat required for the tunnel pasteurizer. It must thereby be taken into account that the amount of heat that is present in the beverage containers as they exit the tunnel pasteurizer, can be recycled into the heating of the beverage as recovered heat, if a spray medium is available to apply a significant temperature gradient toward the exit temperature to the beverage bottles. The present application thereby teaches that the use of a heat exchanger in the cold beverage stream upstream of the filling machine ensures a significantly more effective transfer of heat. The cooling temperature for the exit side of the tunnel pasteurizer is thereby only a few degrees higher than the storage and/or bottling temperature of the beverage.

As shown in FIG. 1, the pasteurizing plant comprises a heating section 2 which is in the entry area, seen in the direction of travel of the respective containers 1, whereby the heating section 2 can consist of a plurality of individual zones 5-7, as a result of which the heating phase can be carried out gradually. Downstream of this heating section 2 is a superheating zone 8, and after that there is the actual pasteurizing zone 9. Then begins the area of the cooling section 4 which, like the other sections, can consist of a larger number of individual zones 10-12.

The operating program of a pasteurizing plant of this type is designed primarily so that the pasteurizing process can be carried out under optimal conditions. For example, the first heating zone 5 has a spray temperature of 18° C. The output temperature of the pasteurized products is correspondingly achieved with a spraying temperature of approximately 17° C. The second heating zone 6 has a spraying temperature slightly higher than 24° C., whereby the cooling zone that communicates with it can in turn be at a slightly lower temperature of 23° C. From the example of these two zones, it can be seen that the water from the "cooling" zones 4 is transported to the zone in the "heating" section 2, the desired heating temperature of which is the closest to the desired cooling temperature. To equalize any temperature difference, water from the first reservoir 13, whose higher-temperature water originates from the final station 7 of the heating section 2, is added in small quantities to the water from the cooling segment 4. Downstream of this heating section is the superheating zone 8, the temperature of which is in turn higher than the temperature of the final heating zone 7 and is supplied from a second reservoir 15 which is at a higher temperature than the first reservoir 13. Associated with the second reservoir 14 is a third reservoir 16 to which the excess water from the reservoir 15 is fed. This third reservoir 16 is also kept at a predetermined higher temperature by means of a heating device. The superheating and pasteurizing zones 8, 9 are also sprayed with water from this reservoir 16, whereby the hot water that drains off is collected in the second reservoir 15 and mixed with the hot water from the third reservoir 16.

In the event of a disruption, for example an interruption caused by a backup of bottles in the pasteurizing plant, a control device (not shown in any greater detail) immediately actuates certain valves so that, for example, the lower-temperature water from the first reservoir 13 is fed to the superheating and/or pasteurizing zones 8, 9. Lower-temperature water can also be supplied to the other section 2, 4, for example from an additional fourth reservoir 14.

In the exemplary embodiment illustrated in FIG. 2, the pasteurizing plant is downstream of a bottling machine 18 to which the cold beverage is fed by means of a line 19. The empty beverage containers are fed to this filling machine on the inlet side 20 and after filling are transported away on the outlet side 21 toward the pasteurizing plant. As shown in the drawing, the warmer pasteurizing liquid is taken from a suitable pasteurizer area 5-7, 10-12 or from elsewhere and is transported to a heat exchanger 22, through which the cold beverage flows at a temperature of 2° C., for example. A corresponding increase in the temperature of the beverage thereby occurs, so that the bottles can be introduced after the filling into the pasteurizing plant at a suitable higher temperature. The warmer pasteurizing liquid is accordingly re-cooled in the heat exchanger 22, whereby a temperature is achieved in the beverage that is slightly higher than its storage temperature. The cooler pasteurizing liquid runs from the heat exchanger 22 preferably toward the exit side of the pasteurizer into the cooling section 4 and/or into the individual zones 10-12, and consequently contributes to a more effective cooling at the exit from the pasteurizer. For this purpose, there can be a direct feed line to the cooling section 4 and/or a corresponding intermediate reservoir 23. It is conceivable, however, that this colder spray water that flows back from the secondary area of the heat exchanger can also be reused at any other point of the pasteurizer, or mixed with water of another temperature. If such further cooling is unnecessary, at the conventional exit temperature can be maintained, and the required treatment time and thus the required size of the tunnel pasteurizer can be reduced accordingly.

One feature or aspect of an embodiment is believed at the time of the filing of this patent application to possibly reside broadly in a beverage bottling plant for filling bottles with a liquid beverage filling material, said beverage bottling plant comprising: a bottle cleaning machine being configured and disposed to clean empty bottles; a feed arrangement to supply empty bottles to said bottle cleaning machine; a beverage filling machine being configured and disposed to fill empty bottles with liquid beverage material; said beverage filling machine comprising a plurality of beverage filling devices for filling bottles with liquid beverage material; at least one storage unit being configured and disposed to store a supply of liquid beverage material; at least one supply line being configured and disposed to connect said at least one storage unit to said beverage filling machine to supply liquid beverage material to said beverage filling machine; a beverage treatment device being configured and disposed to treat with a treatment material said liquid beverage filling material in one of: said at least one storage unit, said at least one supply line, and said beverage filling machine; a first conveyer arrangement being configured and disposed to move empty bottles from said bottle cleaning machine into said beverage filling machine; said first conveyer arrangement comprising a star wheel structure; a bottle closing machine being configured and disposed to close tops of filled beverage bottles; a second conveyer arrangement being configured and disposed to move filled beverage bottles from said beverage filling machine into said bottle closing machine; said second conveyer arrangement comprising a star wheel structure; a beverage bottle treatment station being configured and disposed to further treat liquid beverage material in filled, closed beverage bottles; a third conveyer arrangement being configured and disposed to move filled, closed beverage bottles from said bottle closing machine into said beverage bottle treatment station; said third conveyer arrangement comprising a star wheel structure; a beverage bottle labeling station being configured and disposed to label filled, closed beverage bottles; a fourth conveyor arrangement being configured and disposed to move filled, closed beverage bottles from said beverage bottle treatment station into said beverage bottle labeling station; said fourth conveyer arrangement comprising a star wheel structure; and said treatment material is recycled between and used in both said beverage treatment device and said beverage bottle treatment station.

Another feature or aspect of an embodiment is believed at the time of the filing of this patent application to possibly reside broadly in a beverage bottling plant, wherein said treatment material can be conducted from said beverage treatment device to at least one of a storage area and a zone of said beverage bottle treatment station.

One feature or aspect of an embodiment is believed at the time of the filing of this patent application to possibly reside broadly in a method of operating a beverage bottling plant for filling bottles with a liquid beverage filling material, said beverage bottling plant comprising: a bottle cleaning machine being configured and disposed to clean empty bottles; a feed arrangement to supply empty bottles to said bottle cleaning machine; a beverage filling machine being configured and disposed to fill empty bottles with liquid beverage material; said beverage filling machine comprising a plurality of beverage filling devices for filling bottles with liquid beverage material; at least one storage unit being configured and disposed to store a supply of liquid beverage material; at least one supply line being configured and disposed to connect said at least one storage unit to said beverage filling machine to supply liquid beverage material to said beverage filling machine; a beverage treatment device being configured and disposed to treat with a treatment material said liquid beverage filling material in one of: said at least one storage unit, said at least one supply line, and said beverage filling machine; a first conveyer arrangement being configured and disposed to move empty bottles from said bottle cleaning machine into said beverage filling machine; said first conveyer arrangement comprising a star wheel structure; a bottle closing machine being configured and disposed to close tops of filled beverage bottles; a second conveyer arrangement being configured and disposed to move filled beverage bottles from said beverage filling machine into said bottle closing machine; said second conveyer arrangement comprising a star wheel structure; a beverage bottle treatment station being configured and disposed to further treat liquid beverage material in filled, closed beverage bottles; a third conveyer arrangement being configured and disposed to move filled, closed beverage bottles from said bottle closing machine into said beverage bottle treatment station; said third conveyer arrangement comprising a star wheel structure; a beverage bottle labeling station being configured and disposed to label filled, closed beverage bottles; a fourth conveyor arrangement being configured and disposed to move filled, closed beverage bottles from said beverage bottle treatment station into said beverage bottle labeling station; said fourth conveyer arrangement comprising a star wheel structure; and said treatment material is recycled between and used in both said beverage treatment device and said beverage bottle treatment station, said method comprising the steps of: supplying empty bottles from said feed arrangement to said bottle cleaning machine; cleaning empty bottles with said bottle cleaning machine; moving empty bottles with said first conveyer arrangement to said beverage filling machine; supplying said beverage filling machine with liquid beverage material from said at least one storage unit through said at least one supply line; treating said liquid beverage material with said treatment material of said beverage treatment device; filling empty bottles with treated liquid beverage material; moving filled bottles with said second conveyer arrangement from said beverage filling machine into said bottle closing machine; closing tops of filled beverage bottles with said bottle closing machine; moving filled, closed bottles with said third conveyer arrangement from said bottle closing machine into said beverage bottle treatment station; further treating liquid beverage material in filled, closed beverage bottles with said beverage bottle treatment station; moving filled, closed bottles with said fourth conveyer arrangement from said beverage bottle treatment station into said beverage bottle labeling station; labeling filled, closed beverage bottles with said beverage bottle labeling station; and recycling used treatment material between said beverage treatment device and said beverage bottle treatment station.

A further feature or aspect of an embodiment is believed at the time of the filing of this patent application to possibly reside broadly in a method of operating a beverage bottling plant for filling bottles with a liquid beverage filling material, wherein said step of recycling used treatment material comprises conducting said used treatment material from said beverage treatment device to at least one of a storage area and a zone of said beverage bottle treatment station.

A further feature or aspect of an embodiment is believed at the time of the filing of this patent application to possibly reside broadly in a method for the reduction of energy consumption in bottle handling machines, in particular for the improvement of the heat economy in a pasteurizing plant for the pasteurization of beverages in containers that arrive from a filling machine and are transported in a stream of containers through successive sections of the treatment plant for heating, pasteurizing and cooling with the use of sprayed liquid, characterized by the fact that the bottling temperature of the beverage prior to being bottled into containers is elevated by the heat from the pasteurizing plant and the filled containers are fed to the pasteurizing plant at this elevated product temperature, whereby the recycled cooled process liquid is used at least in one zone of the pasteurizing plant.

Another feature or aspect of an embodiment is believed at the time of the filing of this patent application to possibly reside broadly in a method for the reduction of energy consumption in bottle handling machines, characterized by the fact that the beverage is pre-heated with a process medium of the pasteurizer, the temperature of which is only slightly higher than the bottling temperature. Method for the reduction of energy consumption in bottle handling machines, characterized by the fact that the thermal energy of the containers exiting the pasteurizing plant in the cooling section is used to preheat the beverage.

Yet another feature or aspect of an embodiment is believed at the time of the filing of this patent application to possibly reside broadly in a method as claimed for the reduction of energy consumption in bottle handling machines, characterized by the fact that the cooler process medium recycled after the heat transfer is distributed to the final cooling zone of the pasteurizing plant.

Still another feature or aspect of an embodiment is believed at the time of the filing of this patent application to possibly reside broadly in a method for the reduction of energy consumption in bottle handling machines, characterized by the fact that the thermal transfer into the colder beverage flow is conducted by means of heat exchangers in the entry area to the filling machine.

A further feature or aspect of an embodiment is believed at the time of the filing of this patent application to possibly reside broadly in a device for the performance of the method for the reduction of energy consumption in bottle handling machines with a bottling and pasteurizing plant, characterized by the fact that a heat exchanger (22) is interposed in the beverage line (19) and can be sprayed on the secondary side with the process fluid from the pasteurizing plant which is warmer than the beverage temperature.

Another feature or aspect of an embodiment is believed at the time of the filing of this patent application to possibly reside broadly in a device for the performance of the method for the reduction of energy consumption in bottle handling machines with a bottling and pasteurizing plant, characterized by the fact that the cooler process fluid that flows back on the secondary side can be conducted to a separate reservoir and/or a zone of the cooling area (4) or to another zone of the pasteurizing plant.

Yet another feature or aspect of an embodiment is believed at the time of the filing of this patent application to possibly reside broadly in a beverage bottling plant for filling bottles with a liquid beverage filling material, said beverage bottling plant comprising: a bottle cleaning machine being configured and disposed to clean empty bottles; a feed arrangement to supply empty bottles to said bottle cleaning machine; a beverage filling machine being configured and disposed to fill empty bottles with liquid beverage material; said beverage filling machine comprising a plurality of beverage filling devices for filling bottles with liquid beverage material; at least one storage unit being configured and disposed to store a supply of liquid beverage material; at least one supply line being configured and disposed to connect said at least one storage unit to said beverage filling machine to supply liquid beverage material to said beverage filling machine; said at least one supply line comprises a beverage treatment device being configured and disposed to treat with a treatment material said liquid beverage filling material; a first conveyer arrangement being configured and disposed to move empty bottles from said bottle cleaning machine into said beverage filling machine; said first conveyer arrangement comprising a star wheel structure; a bottle closing machine being configured and disposed to close tops of filled beverage bottles; a second conveyer arrangement being configured and disposed to move filled beverage bottles from said beverage filling machine into said bottle closing machine; said second conveyer arrangement comprising a star wheel structure; a beverage bottle treatment station being configured and disposed to further treat liquid beverage material in filled, closed beverage bottles; a third conveyer arrangement being configured and disposed to move filled, closed beverage bottles from said bottle closing machine into said beverage bottle treatment station; said third conveyer arrangement comprising a star wheel structure; a beverage bottle labeling station being configured and disposed to label filled, closed beverage bottles; a fourth conveyor arrangement being configured and disposed to move filled, closed beverage bottles from said beverage bottle treatment station into said beverage bottle labeling station; said fourth conveyer arrangement comprising a star wheel structure; and said treatment material is recycled between and used in both said beverage treatment device and said beverage bottle treatment station.

Still another feature or aspect of an embodiment is believed at the time of the filing of this patent application to possibly reside broadly in a beverage bottling plant, wherein said treatment material can be conducted from said beverage treatment device to at least one of a storage area and a zone of said beverage bottle treatment station.

A further feature or aspect of an embodiment is believed at the time of the filing of this patent application to possibly reside broadly in a method of operating a beverage bottling plant for filling bottles with a liquid beverage filling material, said beverage bottling plant comprising: a bottle cleaning machine being configured and disposed to clean empty bottles; a feed arrangement to supply empty bottles to said bottle cleaning machine; a beverage filling machine being configured and disposed to fill empty bottles with liquid beverage material; said beverage filling machine comprising a plurality of beverage filling devices for filling bottles with liquid beverage material; at least one storage unit being configured and disposed to store a supply of liquid beverage material; at least one supply line being configured and disposed to connect said at least one storage unit to said beverage filling machine to supply liquid beverage material to said beverage filling machine; said at least one supply line comprises a beverage treatment device being configured and disposed to treat with a treatment material said liquid beverage filling material; a first conveyer arrangement being configured and disposed to move empty bottles from said bottle cleaning machine into said beverage filling machine; said first conveyer arrangement comprising a star wheel structure; a bottle closing machine being configured and disposed to close tops of filled beverage bottles; a second conveyer arrangement being configured and disposed to move filled beverage bottles from said beverage filling machine into said bottle closing machine; said second conveyer arrangement comprising a star wheel structure; a beverage bottle treatment station being configured and disposed to further treat liquid beverage material in filled, closed beverage bottles; a third conveyer arrangement being configured and disposed to move filled, closed beverage bottles from said bottle closing machine into said beverage bottle treatment station; said third conveyer arrangement comprising a star wheel structure; a beverage bottle labeling station being configured and disposed to label filled, closed beverage bottles; a fourth conveyor arrangement being configured and disposed to move filled, closed beverage bottles from said beverage bottle treatment station into said beverage bottle labeling station; said fourth conveyer arrangement comprising a star wheel structure; and said treatment material is recycled between and used in both said beverage treatment device and said beverage bottle treatment station, said method comprising the steps of: supplying empty bottles from said feed arrangement to said bottle cleaning machine; cleaning empty bottles with said bottle cleaning machine; moving empty bottles with said first conveyer arrangement to said beverage filling machine; supplying said beverage filling machine with liquid beverage material from said at least one storage unit through said at least one supply line; treating said liquid beverage material in said at least one supply line with said treatment material of said beverage treatment device; filling empty bottles with treated liquid beverage material; moving filled bottles with said second conveyer arrangement from said beverage filling machine into said bottle closing machine; closing tops of filled beverage bottles with said bottle closing machine; moving filled, closed bottles with said third conveyer arrangement from said bottle closing machine into said beverage bottle treatment station; further treating liquid beverage material in filled, closed beverage bottles with said beverage bottle treatment station; moving filled, closed bottles with said fourth conveyer arrangement from said beverage bottle treatment station into said beverage bottle labeling station; labeling filled, closed beverage bottles with said beverage bottle labeling station; and recycling used treatment material between said beverage treatment device and said beverage bottle treatment station.

Another feature or aspect of an embodiment is believed at the time of the filing of this patent application to possibly reside broadly in a method of operating a beverage bottling plant for filling bottles with a liquid beverage filling material, wherein said step of recycling used treatment material comprises conducting said used treatment material from said beverage treatment device to at least one of a storage area and a zone of said beverage bottle treatment station.

Yet another feature or aspect of an embodiment is believed at the time of the filing of this patent application to possibly reside broadly in a beverage bottling plant for filling bottles with a liquid beverage filling material, and a method for the reduction of energy consumption in bottle handling machines, which is characterized by the fact that the bottling temperature of the beverage prior to being bottled into containers is elevated by the heat from the pasteurizing plant, and the filled bottles are fed to the pasteurizing plant at this elevated product temperature, whereby the recovered cooled process liquid is used at least in one zone of the pasteurizing plant.

The components disclosed in the various publications, disclosed or incorporated by reference herein, may possibly be used in possible embodiments, as well as equivalents thereof.

Some examples of beverage bottling systems which may possibly be utilized or adapted for use in at least one possible embodiment may possibly be found in the following U.S. Patents, and are hereby incorporated by reference as if set forth in their entirety herein: U.S. Pat. No. 6,494,238, entitled "Plant for filling beverage into beverage bottles and other beverage containers having apparatus for replacing remaining air volume in filled beverage bottles or other beverage containers;" U.S. Pat. No. 6,474,368, entitled "Beverage container filling machine, and method for filling containers with a liquid filling material in a beverage container filling machine;" U.S. Pat. No. 6,470,922, entitled "Bottling plant for bottling carbonated beverages;" U.S. Pat. No. 6,463,964, entitled "Method of operating a machine for filling bottles, cans or the like beverage containers with a beverage, and a beverage container filling machine;" U.S. Pat. No. 6,374,575, entitled "Bottling plant and method of operating a bottling plant;" U.S. Pat. No. 6,365,054, entitled "Plant for filling containers and a method for operating a plant for filling containers," U.S. Pat. No. 6,192,946, entitled "Bottling system;" U.S. Pat. No. 6,189,578, entitled "Filling system and filling element;" U.S. Pat. No. 6,058,985, entitled "Bottling machine with a set-up table and a set-up table for a bottling machine and a set-up table for a bottle handling machine;" U.S. Pat. No. 5,713,403, entitled "Method and system for filling containers with a liquid filling product, and filling machine and labelling device for use with this method or system," U.S. Pat. No. 5,634,500, entitled "Method for bottling a liquid in bottles or similar containers;" and U.S. Pat. No. 5,413,153, entitled "Container filling machine for filling open-top containers, and a filler valve therefor."

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

Some examples of heat exchangers which may possibly be utilized or adapted for use in at least one possible embodiment may possibly be found in the following U.S. Patents: U.S. Pat. No. 4,665,975, entitled "Plate type heat exchanger;" U.S. Pat. No. 6,810,948, entitled "Heat exchanger;" U.S. Pat. No. 6,799,428, entitled "Heat exchanger;" U.S. Pat. No. 6,394,179, entitled "Plate heat exchanger;" U.S. Pat. No. 6,125,649, entitled "Heat exchanger unit with conductive discs;" U.S. Pat. No. 5,579,650, entitled "Heat exchanger;" and U.S. Pat. No. 4,313,491, entitled "Coiled heat exchanger."

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Some examples of temperature sensors or sensor systems that may be used or adapted for use in at least one possible embodiment of the present invention may be found in the following U.S. patents: U.S. Pat. No. 5,960,857, issued to inventors Oswalt et al. on Oct. 5, 1999; U.S. Pat. No. 5,942,980, issued to inventors Hoben et al. on Aug. 24, 1999; U.S. Pat. No. 5,881,952, issued to inventor MacIntyre on Mar. 16, 1999; U.S. Pat. No. 5,862,669, issued to inventors Davis et al. on Jan. 26, 1999; U.S. Pat. No. 5,459,890, issued to inventor Jarocki on Oct. 24, 1995; U.S. Pat. No. 5,367,602, issued to inventor Stewart on Nov. 22, 1994; U.S. Pat. No. 5,319,973, issued to inventors Crayton et al. on Jun. 14, 1994; U.S. Pat. No. 5,226,320, issued to inventors Dages et al. on Jul. 13, 1993; U.S. Pat. No. 5,078,123, issued to inventors Nagashima et al. on Jan. 7, 1992; and U.S. Pat. No. 5,068,030, issued to inventor Chen on Nov. 26, 1991.

Some examples of position sensors or position sensor systems that may be used or adapted for use in at least one possible embodiment of the present invention may be found in the following U.S. patents: U.S. Pat. No. 5,794,355, issued to inventor Nickum on Aug. 18, 1998; U.S. Pat. No. 5,520,290, issued to inventors Kumar et al. on May 28, 1996; U.S. Pat. No. 5,074,053, issued to inventor West on Dec. 24, 1991; and U.S. Pat. No. 4,087,012, issued to inventor Fogg on May 2, 1978.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . ." may possibly not be used or useable in any one or more embodiments of the application.

The sentence immediately above relates to patents, published patent applications and other documents either incorporated by reference or not incorporated by reference.

Some examples of heaters or heat exchangers, cooling systems, valves, pumps, or tanks that may be used or adapted for use in at least one possible embodiment of the present invention may be found in the following U.S. patents: U.S. Pat. No. 5,881,952, issued to inventor MacIntyre on Mar. 16, 1999; U.S. Pat. No. 5,862,669, issued to inventors Davis et al. on Jan. 26, 1999; U.S. Pat. No. 5,459,890, issued to inventor Jarocki on Oct. 24, 1995; U.S. Pat. No. 5,367,602, issued to inventor Stewart on Nov. 22, 1994; U.S. Pat. No. 5,319,973, issued to inventors Crayton et al. on Jun. 14, 1994; U.S. Pat. No. 5,226,320, issued to inventors Dages et al. on Jul. 13, 1993; U.S. Pat. No. 5,078,123, issued to inventors Nagashima et al. on Jan. 7, 1992; and U.S. Pat. No. 5,068,030, issued to inventor Chen on Nov. 26, 1991.

The corresponding foreign and international patent publication applications, namely, Federal Republic of Germany Patent Application No. 103 51 689, filed on Nov. 6, 2003, having inventors Jan MÜNZER, Thomas STOLTE, and Volker TILL, and DE-OS 103 51 689 and DE-PS 103 51 689, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of operating a container filling plant for filling containers with a liquid beverage material, said method comprising the steps of:

storing liquid beverage material at a first beverage temperature in a storage reservoir;

feeding treatment liquid from at least one of: a first, heating, section and a third, cooling, section of a beverage pasteurizing machine and into a heat exchanger;

flowing liquid beverage material from said storage reservoir, through a supply conduit, and to filling devices of a container filling machine;

heating liquid beverage material flowing through said supply conduit with treatment liquid having a first treatment temperature in said heat exchanger to a second beverage temperature, which is higher than said first beverage temperature, and substantially simultaneously cooling said treatment liquid having said first treatment temperature to a lower, fifth treatment temperature;

returning said treatment liquid having said fifth treatment temperature from said heat exchanger, through a direct feed line, and into said beverage pasteurizing machine;

filling empty containers with liquid beverage material having said second beverage temperature and then closing the filled containers;

moving filled, closed containers into said beverage pasteurizing machine;

moving filled, closed containers through said first, heating, section and dispensing treatment liquid having a second treatment temperature and further heating liquid beverage material in the filled, closed beverage containers in said first, heating, section to a third beverage temperature, which is higher than said second beverage temperature;

then moving filled, closed containers through a second, pasteurizing, section and dispensing treatment liquid having a third treatment temperature and further heating liquid beverage material in the filled, closed beverage containers in said second, pasteurizing, section to a fourth, pasteurizing, beverage temperature, which is higher than said third beverage temperature; and then moving filled, closed containers through said third, cooling, section and dispensing treatment liquid having a fourth treatment temperature and cooling liquid beverage material in the filled, closed containers in said third, cooling, section to a fifth beverage temperature, which is lower than said fourth, pasteurizing, beverage temperature.

2. The method according to claim 1, wherein said step of returning said treatment liquid having said fifth treatment temperature from said heat exchanger into said beverage pasteurizing machine comprises conducting said treatment liquid having said fifth treatment temperature from said heat exchanger into at least one of: a storage reservoir of said beverage pasteurizing machine, said first, heating, section, and said third, cooling, section.

3. The method according to claim 1, wherein said step of returning said treatment liquid having said fifth treatment temperature from said heat exchanger into said beverage pasteurizing machine comprises conducting said treatment liquid having said fifth treatment temperature from said heat exchanger into said third, cooling, section.

4. The method according to claim 1, further comprising the steps of:

heating said treatment liquid having said fourth treatment temperature in said third, cooling, section using heat from liquid beverage material in filled, closed containers having said fourth, pasteurizing, beverage temperature to a sixth treatment temperature which is higher than said fourth treatment temperature; and one of (A), (B), and (C):
(A) recycling said treatment liquid having said sixth treatment temperature to said heating zone;
(B) recycling said treatment liquid having said sixth treatment temperature to said heat exchanger; and
(C) recycling a first portion of said treatment liquid having said sixth treatment temperature to said heating zone and recycling a second portion of said treatment liquid having said sixth treatment temperature to said heat exchanger.

5. The method according to claim 4, further comprising the step of recycling said treatment liquid having said sixth treatment temperature to said heating zone.

6. The method according to claim 4, further comprising the step of recycling said treatment liquid having said sixth treatment temperature to said heat exchanger.

7. The method according to claim 4, further comprising the step of recycling a first portion of said treatment liquid having said sixth treatment temperature to said heating zone and recycling a second portion of said treatment liquid having said sixth treatment temperature to said heat exchanger.

8. The method according to claim 1, wherein said first treatment temperature is at least about 18° C.

9. The method according to claim 8, further comprising the steps of:

heating said treatment liquid having said fourth treatment temperature in said third, cooling, section using heat from liquid beverage material in filled, closed containers having said fourth, pasteurizing, beverage temperature to a sixth treatment temperature which is higher than said fourth treatment temperature; and recycling said treatment liquid having said sixth treatment temperature to said heat exchanger; and wherein said step of returning said treatment liquid having said fifth treatment temperature from said heat exchanger into said beverage pasteurizing machine comprises conducting said treatment liquid having said fifth treatment temperature from said heat exchanger into said third, cooling, section.

10. The method according to claim 1, further comprising the steps of:

heating said treatment liquid having said fourth treatment temperature in said third, cooling, section using heat from liquid beverage material in filled, closed containers having said fourth, pasteurizing, beverage temperature to a sixth treatment temperature which is higher than said fourth treatment temperature; and recycling said treatment liquid having said sixth treatment temperature to said heat exchanger; and wherein said step of returning said treatment liquid having said fifth treatment temperature from said heat exchanger into said beverage pasteurizing machine comprises conducting said treatment liquid having said fifth treatment temperature from said heat exchanger into said third, cooling, section.

11. A method of operating a beverage bottling plant for filling bottles with a liquid beverage material, said beverage bottling plant comprising: a beverage filling machine being configured and disposed to fill bottles with liquid beverage material; said beverage filling machine comprising a plurality of beverage filling devices for filling bottles with liquid beverage material; a storage reservoir being configured and disposed to store a supply of liquid beverage material at a first beverage temperature; a supply conduit being configured and disposed to operatively connect said beverage filling devices to said storage reservoir to permit the flow of liquid beverage material from said storage reservoir to said beverage filling devices; a heat exchanger being configured and disposed to heat liquid beverage material flowing through said supply conduit to a second beverage temperature, which is higher than said first beverage temperature, with treatment liquid having a first treatment temperature; a bottle closing machine being configured and disposed to close filled bottles; a beverage pasteurizing machine being configured and disposed to pasteurize liquid beverage material in filled, closed bottles; said beverage pasteurizing machine comprising at least: a first, heating, section being configured and disposed to dispense treatment liquid having a second treatment temperature to heat liquid beverage material in filled, closed bottles to a third beverage temperature which is higher than said second beverage temperature; a second, pasteurizing, section being configured and disposed to dispense treatment liquid having a third treatment temperature to heat liquid beverage material in filled, closed bottles to a fourth, pasteurizing, beverage temperature which is higher than said third beverage temperature; a third, cooling, section being configured and disposed to dispense treatment liquid having a fourth treatment temperature to cool pasteurized liquid beverage material in filled, closed bottles to a fifth beverage temperature which is lower than said fourth, pasteurizing, beverage temperature; and a direct feed line being configured and disposed to connect said heat exchanger to said beverage pasteurizing machine to return and recycle treatment liquid having a fifth treatment temperature, which is lower than said first treatment temperature, from said heat exchanger to said beverage pasteurizing machine; said method comprising the steps of:

storing liquid beverage material at a first beverage temperature in said storage reservoir;

feeding treatment liquid from at least one of: said first, heating, section and said third, cooling, section of said beverage pasteurizing machine and into said heat exchanger;

flowing liquid beverage material from said storage reservoir, through said supply conduit, and to said filling devices;

heating liquid beverage material flowing through said supply conduit with said treatment liquid having said first treatment temperature in said heat exchanger to said second beverage temperature which is higher than said first beverage temperature, and substantially simultaneously cooling said treatment liquid having said first treatment temperature to said lower, fifth treatment temperature;

returning said treatment liquid having said fifth treatment temperature from said heat exchanger, through said direct feed line, and into said beverage pasteurizing machine;

filling empty bottles with liquid beverage material having said second beverage temperature;

moving filled bottles from said beverage filling machine into said bottle closing machine;

closing filled bottles with said bottle closing machine;

moving filled, closed bottles from said bottle closing machine into said beverage pasteurizing machine;

moving filled, closed bottles through said first, heating, section and dispensing treatment liquid having a second treatment temperature and further heating liquid beverage material in the filled, closed bottles in said first, heating, section to said third beverage temperature;

then moving filled, closed bottles through said second, pasteurizing, section and dispensing treatment liquid having said third treatment temperature and further heating liquid beverage material in the filled, closed bottles in said second, pasteurizing, section to said fourth, pasteurizing, beverage temperature; and then moving filled, closed bottles through said third, cooling, section and dispensing treatment liquid having said fourth treatment temperature and cooling liquid beverage material in the filled, closed bottles in said third, cooling, section to said fifth beverage temperature.

12. The method according to claim 11, wherein said first treatment temperature is at least about 18° C.

13. The method according to claim 12, further comprising the steps of:

heating said treatment liquid having said fourth treatment temperature in said third, cooling, section using heat from liquid beverage material in filled, closed bottles having said fourth, pasteurizing, beverage temperature to a sixth treatment temperature which is higher than said fourth treatment temperature; and recycling said treatment liquid having said sixth treatment temperature to said heat exchanger.

14. The method according to claim 13, wherein said step of returning said treatment liquid having said fifth treatment temperature from said heat exchanger into said beverage pasteurizing machine comprises conducting said treatment liquid having said fifth treatment temperature from said heat exchanger into said third, cooling, section.

15. The method according to claim 11, further comprising the steps of:

heating said treatment liquid having said fourth treatment temperature in said third, cooling, section using heat from liquid beverage material in filled, closed bottles having said fourth, pasteurizing, beverage temperature to a sixth treatment temperature which is higher than said fourth treatment temperature; and recycling said treatment liquid having said sixth treatment temperature to said heat exchanger.

16. The method according to claim 15, wherein said step of returning said treatment liquid having said fifth treatment temperature from said heat exchanger into said beverage pasteurizing machine comprises conducting said treatment liquid having said fifth treatment temperature from said heat exchanger into said third, cooling, section.

17. The method according to claim 11, wherein said step of returning said treatment liquid having said fifth treatment temperature from said heat exchanger into said beverage pasteurizing machine comprises conducting said treatment liquid having said fifth treatment temperature from said heat exchanger into at least one of: a storage reservoir of said beverage pasteurizing machine, said first, heating, section, and said third, cooling, section.

18. The method according to claim 11, wherein said step of returning said treatment liquid having said fifth treatment temperature from said heat exchanger into said beverage pasteurizing machine comprises conducting said treatment liquid having said fifth treatment temperature from said heat exchanger into said third, cooling, section.

* * * * *